United States Patent [19]
Mittendorf

[11] 3,854,647
[45] Dec. 17, 1974

[54] SELF-ADJUSTING STOCK CENTRALIZER

[76] Inventor: Jean H. Mittendorf, 82 Pawnee Ave., Oakland, N.J. 07436

[22] Filed: Feb. 11, 1974

[21] Appl. No.: 441,370

[52] U.S. Cl. .................. 226/198, 226/165, 226/167
[51] Int. Cl. ............................................ B65h 23/28
[58] Field of Search ...... 242/76; 226/198, 199, 165, 226/166, 167

[56] References Cited
UNITED STATES PATENTS

| | | | |
|---|---|---|---|
| 1,735,288 | 11/1929 | Leonard | 226/166 X |
| 2,657,933 | 11/1953 | Stuebner | 226/166 X |
| 3,692,223 | 9/1972 | Laigle | 226/199 |

Primary Examiner—Richard A. Schacher

[57] ABSTRACT

Elongated work pieces being fed into a machining station are kept in center alignment by spaced slidably mounted wedge-shaped plates. The plates are supported by a fixed base to which is secured spaced, fixed, guide members. A cover overlies the plates and a depending pin secured to the cover engages the plates to keep them in spaced alignment and the work pieces therebetween in center alignment.

7 Claims, 4 Drawing Figures

PATENTED DEC 17 1974 3,854,647
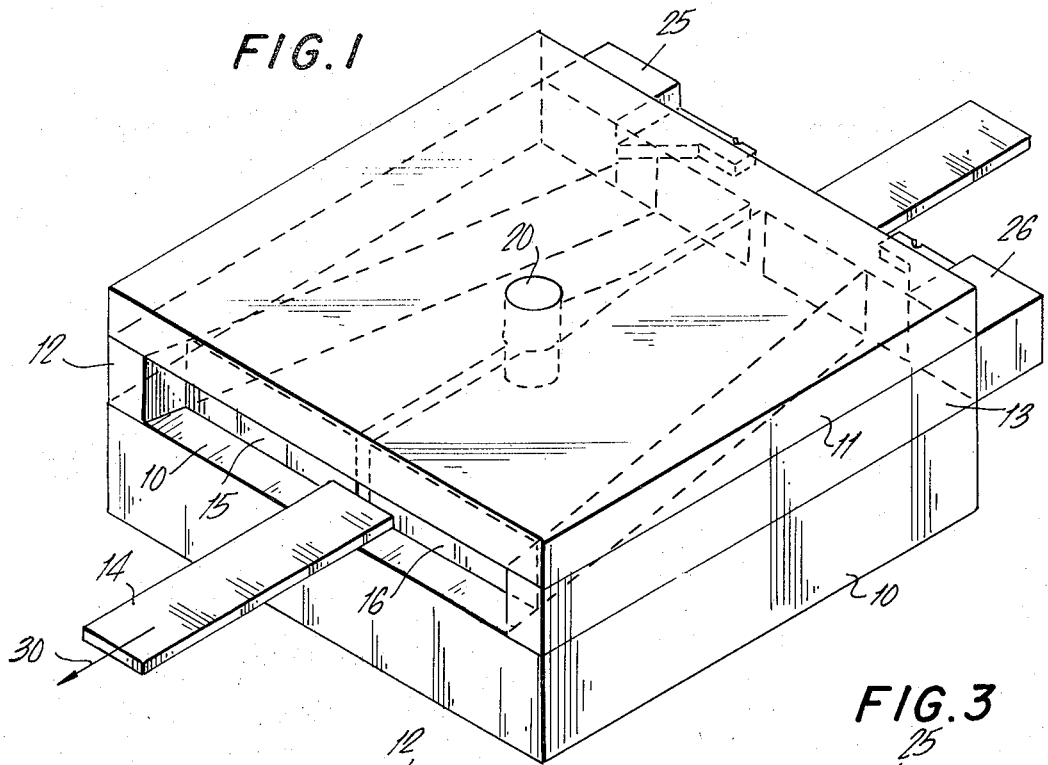
FIG.1
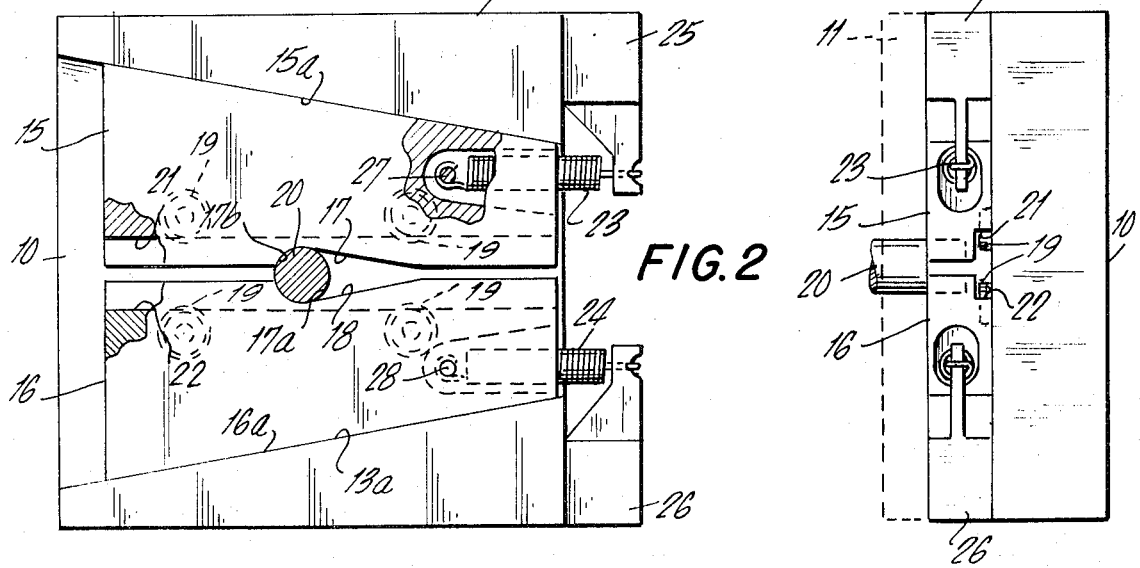
FIG.2
FIG.3
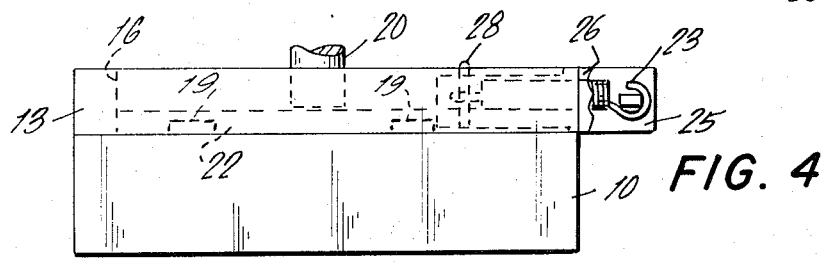
FIG. 4

SELF-ADJUSTING STOCK CENTRALIZER

BACKGROUND OF THE INVENTION

It is often necessary in the metal and plastics working industry to feed long lengths of material and particularly flat stock into machines or work stations. In such cases, the work material must be accurately fed into the station where it is shaped, stamped, ground, or machined. The big problem in such operations is retaining the work piece in axial or center alignment with the cutting or grinding tool so that the finished work is uniform. Prior attempts at linear alignment have included the use of rollers, V-blocks, and other types of guide plates. All these attempts are lacking in several respects. They do not compensate for size variations, they are not precise, and they cannot be adapted easily to handle work of differing sizes.

The invention hereinafter described is precise because it grips the work piece between two self-adjusting aligning plates at all times. Work pieces of varying sizes are handled easily, either by using the same aligning plates at different spacings or by substituting other aligning plates in the same chuck assembly.

SUMMARY

The invention includes a base for supporting all the components of the guide, a cover secured to the base, and a pair of fixed guides mounted between the cover and the base formed with sloping side bearing surfaces and defining a wedge shaped space.

A pair of tapered aligning plates are positioned in the space between the cover and the base, each aligning plate formed with outer sloping edges to engage the sloping bearing surfaces of the guides. An alignment pin is secured to the cover and extends downwardly to engage the inner edges of the aligining plates, and assist in their transverse alignment. The aligning plates are each formed with an elongated step at their inner edges and spaced rollers to direct a work piece as it is moved through the guide assembly. Resilient means are disposed between the aligning plates and the base for urging the aligning plates along the sloping guides to yieldably hold a work piece in the channels.

A feature of the invention is the use of tapered, slidable, aligning plates to center the work piece as it is pushed or drawn through the aligning plates.

Another feature of the invention is the ability of the guide assembly to automatically compensate for variations in size of the work piece.

Another feature of the invention is the ease with which the assembly can be changed to accommodate for work pieces having different sized and shapes.

A further feature is the use of spaced rollers carried by the aligning plates to guide the work piece.

Other features and additional details of the invention will be disclosed in the following description, taken in connection with the accompanying drawings.

BRIEF DESCRIPTION OF THE FIGURES

FIG. 1 is a perspective view of a guide assembly according to the present invention shown with a work piece but omitting the resilient means for the sake of clarity.

FIG. 2 is a top view of the guide assembly with the cover removed to show the details of the aligning plates.

FIG. 3 is an end view of the guide assembly with the cover indicated in dotted lines.

FIG. 4 is a side view of the guide assembly, also with the cover.

DESCRIPTION OF THE PREFERRED EMBODIMENT

Referring now to the figures, the guide assembly includes a flat base 10, a cover 11, and spaced wedge shaped guides 12 and 13. The guides 12, 13 are secured to the base 10. As is shown in FIG. 2, the guides 12, 13 are formed with sloping edges 12a and 13a which form an angle of about 10 degrees with their outer edges thereby creating a wedge shaped space between the guides. Two tapered aligning plates 15 and 16 are mounted between the guides 12, 13 in the wedge shaped space and are formed with outer sloping edges 15a, 16a which match the sloping edges 12a and 13a of the guides. The inner edges of the aligning plates are generally parallel to each other and spaced a short distance from the center line of the assembly. Each aligning plate is formed with a cut-out portion 17 and 18 which includes a slope 17a, parallel to edges 12a and 13a and a partly cylindrical surface 17b for engaging a pin 20. The pin 20 is secured to the cover and extends inwardly thereof.

In order to guide the work piece 14, elongated steps 21 and 22 are cut in the inner edges of the aligning plates 15 and 16. These steps may be straight sided, as shown in the figures, or they may have curved surfaces to conform with the work piece.

Spaced rollers 19 are freely journaled in each of the aligning plates and extend into the stepped portions 21,22 to engage the edges of the work piece 14 and guide it through the device. These rollers permit occasional imperfections in the material being fed through the device to advance without jeopardizing its centralizing performance. In addition, the rollers 19 discourage the formation of scrapings and chips from the work piece.

Each aligning plate is coupled to a resilient means of some type to urge the aligning plates 15, 16 toward the narrow end of the wedge shaped space to bear against the work piece. In FIG. 2,3, and 4, a pair of helical springs 23 and 24 are shown for this purpose. The springs are mounted on brackets 25 and 26 and extend into cavities in the plates 15,16 where their ends are secured by pins 27 and 28.

When there is no work piece in the guide assembly, the position of the aligning plates 15, 16 is as shown in FIGS. 2, 3, and 4 with the curved ends of cut-out portions 17 and 18 in limiting engagement with pin 20. When a work piece 14 is pushed into the space formed by steps 21 and 22, the aligning plates 15, 16 are moved along the guides 12, 13 (FIG. 2), the space between them is enlarged and the rollers 19 engage the edges of the work piece and hold it in central alignment. Springs 23,24 pull the aligning plates toward a work piece engaging position at all times, but the assembly cannot bind the work piece since it is being moved in the direction of the arrow 30 (see FIG. 1) and any tendency to bind will be eliminated by a slight movement of the chuck plates along the guides.

As the aligning plates 15, 16 are moved to the left (in FIG. 2) to accommodate a work piece that is larger, the surfaces 17, 18 ride upon the surface of the alignment pin and keep the plates in transverse alignment. The result is a continuous centering action on an elongated work piece while moving through the guide assembly.

Having thus fully described the invention, what is claimed as new and desired to be secured by Letters Patent of the United States is:

1. A self-adjusting guide assembly for center alignment of elongated work pieces comprising:
   a. a base for supporting all the components of the guide;
   b. a cover secured to the base;
   c. a pair of spaced, fixed guides mounted between the cover and base and formed with inner sloping edges for defining a wedge shaped space therebetween;
   d. a pair of slidable aligning plates positioned in the space between the guides; said plates formed with outer sloping edges to engage the inner sloping edges of the guides;
   e. an alignment pin secured to the cover and depending therefrom to engage the inner edges of the aligning plates, and
   f. resilient means disposed between the aligning plates and the base for urging the aligning plates along the guide rods to yieldably hold a work piece in the aligning plates.

2. A guide as claimed in claim 1 wherein said resilient means are a pair of helical springs.

3. A guide as claimed in claim 1 wherein the lower surface of the cover and the upper surface of the base are flat and parallel to each other.

4. A guide as claimed in claim 1 wherein each of said guides is formed with an outer parallel edge and has a sloping inner edge making an angle of substantially 10 degrees with the outer edge.

5. A guide as claimed in claim 1 wherein the edge of each aligning plate is formed with an elongated step in its inner margin to receive the work piece.

6. A guide as claimed in claim 1 wherein each of the aligning plates is formed with a cut-out portion to receive the alignment pin, said cut-out portions comprising a portion of a cylindrical surface to engage the alignment pin when no work piece is in the chuck plates, and a sloping surface having the same slope as the inner surface of the guide rods.

7. A guide according to claim 1 wherein rollers are freely journaled in the periphery of each aligning plate with a portion of each roller extending into the space between the aligning plates.

* * * * *